No. 709,388. Patented Sept. 16, 1902.
A. BONTEMPI.
SCULPTURING MACHINE.
(Application filed May 23, 1901.)
(No Model.) 4 Sheets—Sheet 1.
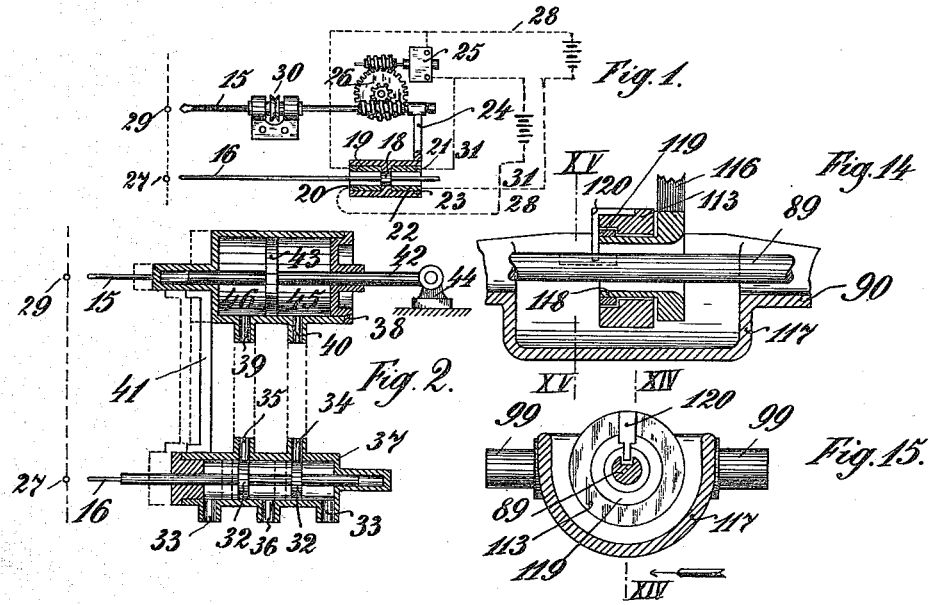
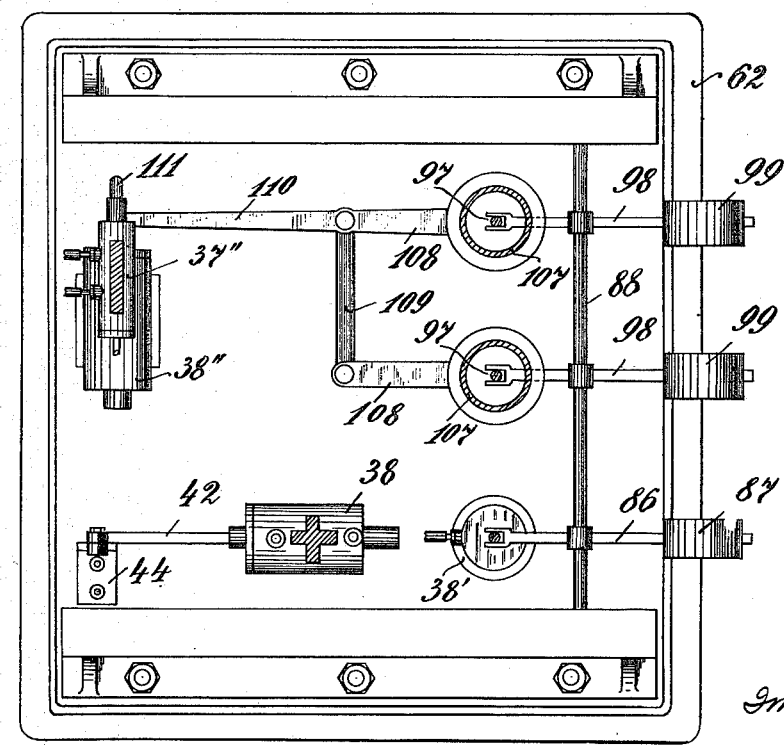
Witnesses: Katherine E. Manning, Harry G. Knight
Inventor: Augusto Bontempi
By Knight Bros.
Attorneys.

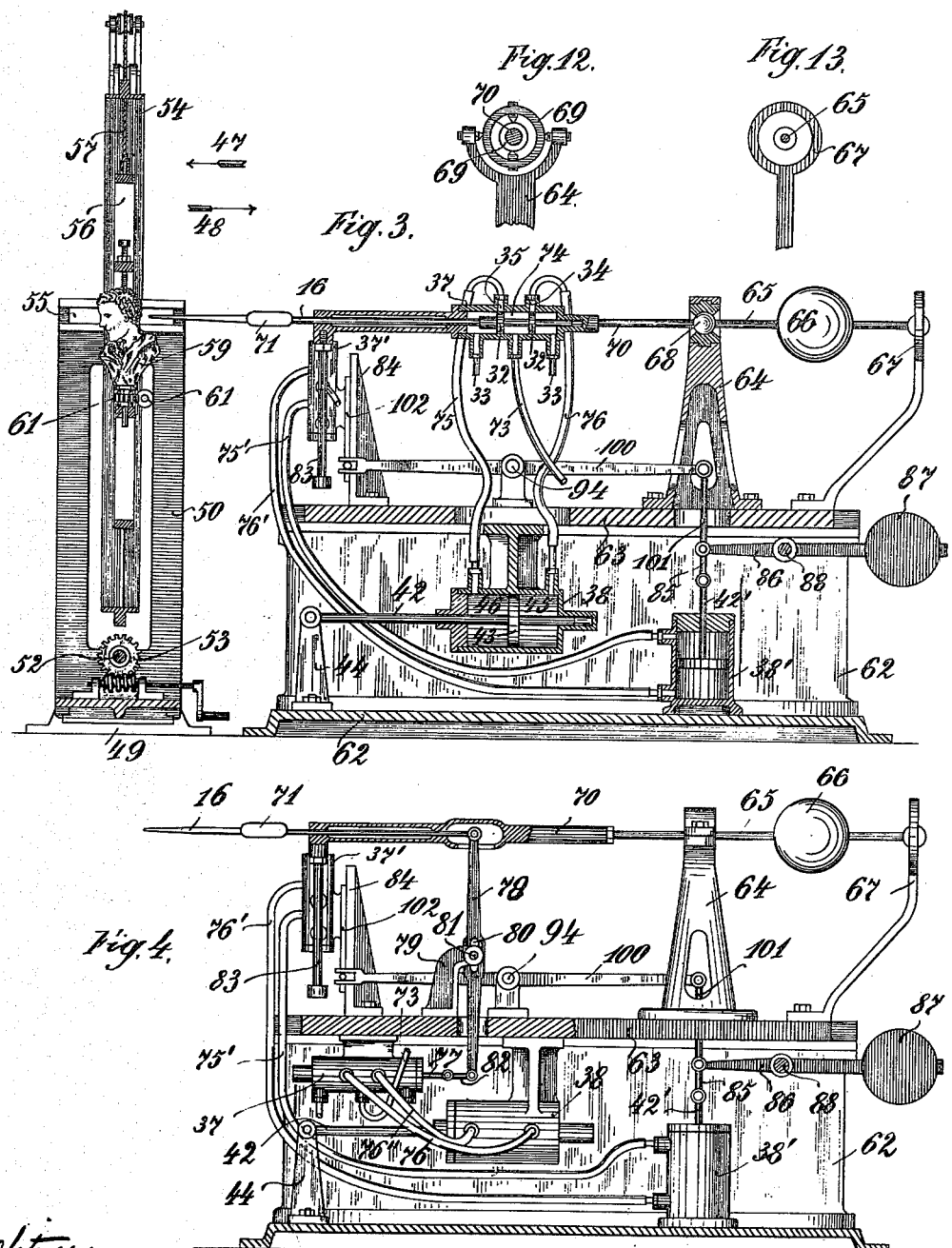

No. 709,388. Patented Sept. 16, 1902.
A. BONTEMPI.
SCULPTURING MACHINE.
(Application filed May 23, 1901.)
(No Model.) 4 Sheets—Sheet 3.
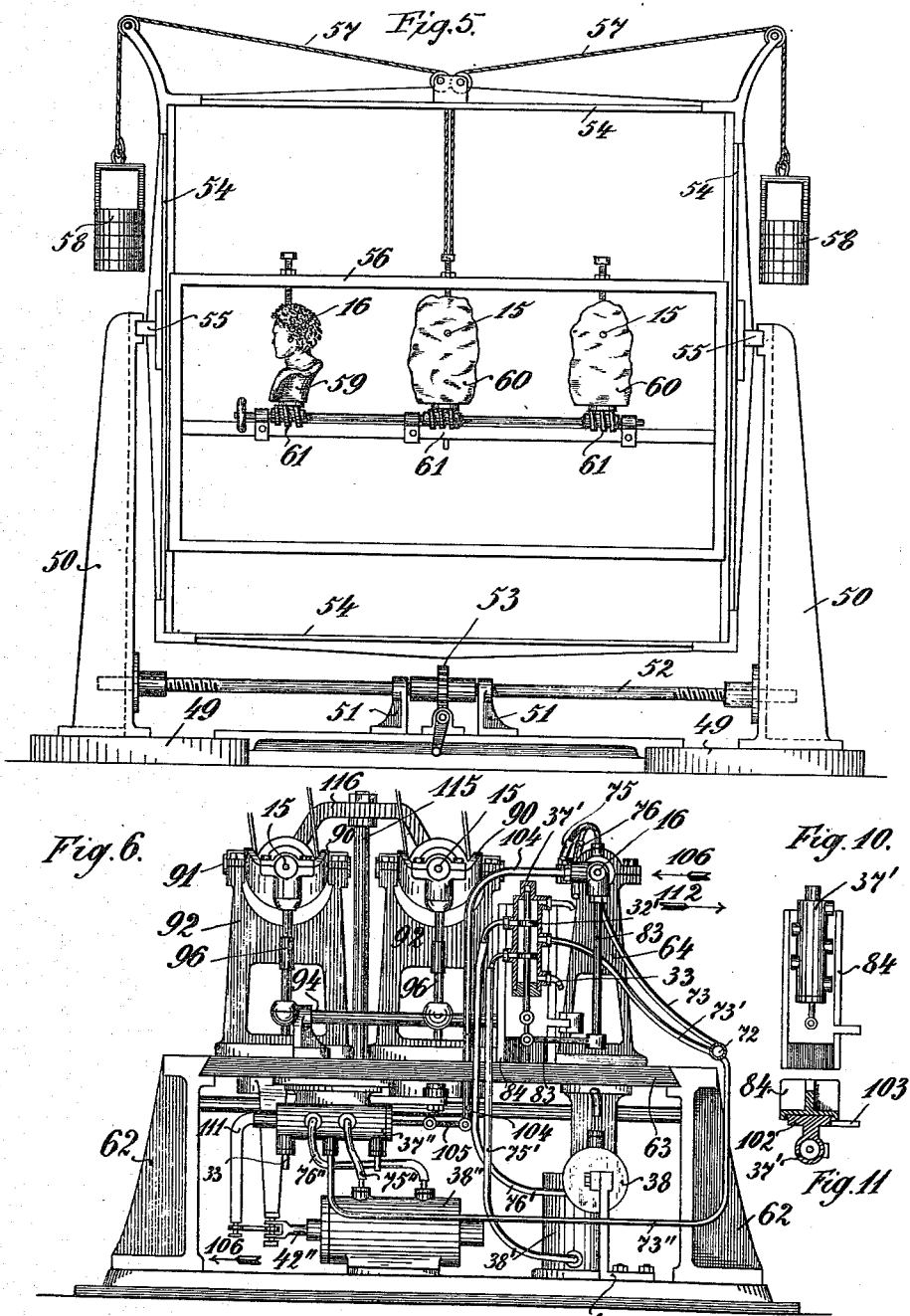

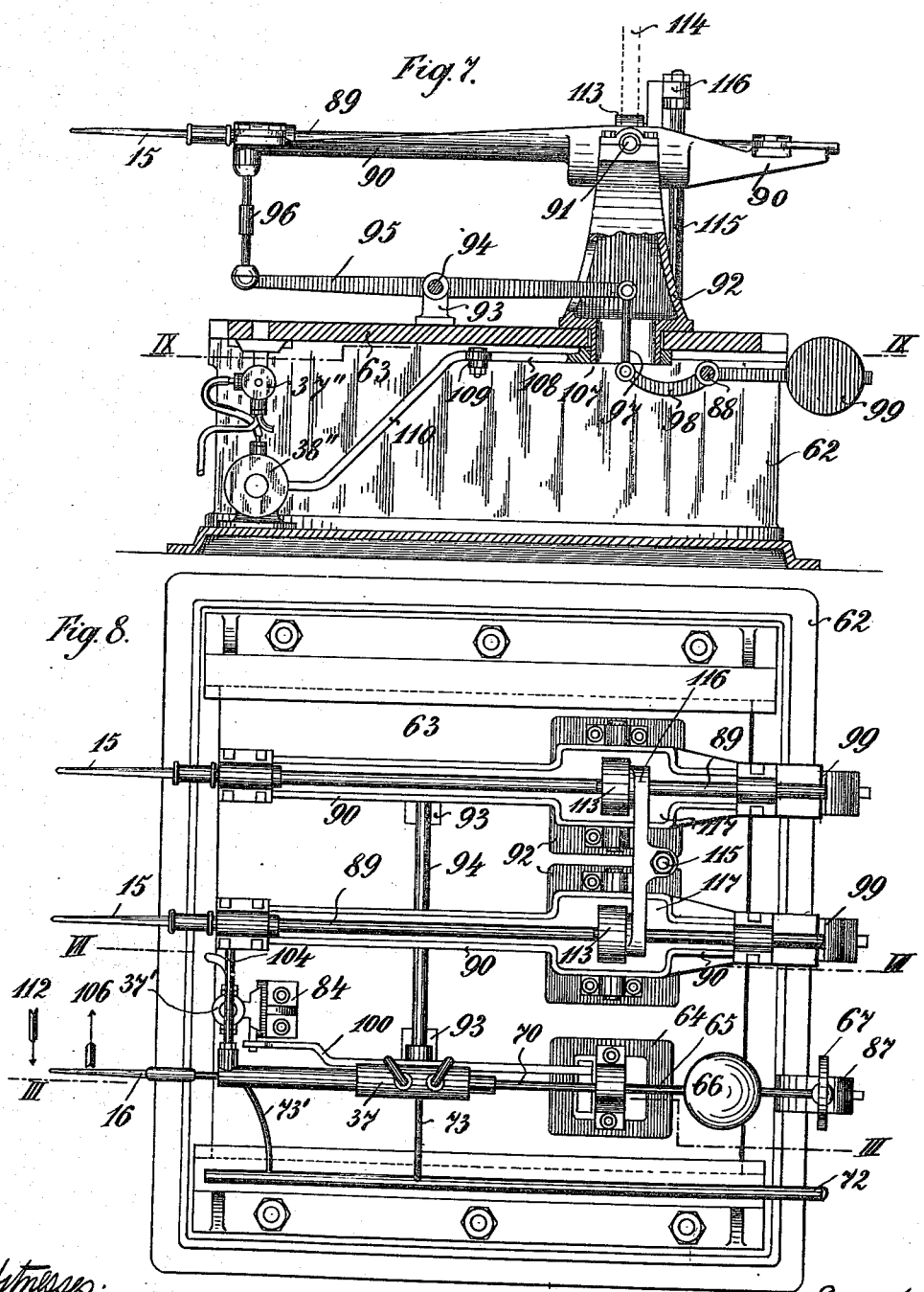

UNITED STATES PATENT OFFICE.

AUGUSTO BONTEMPI, OF NAPLES, ITALY, ASSIGNOR TO MARY BELLE SCOTT-UDA, OF NAPLES, ITALY.

SCULPTURING-MACHINE.

SPECIFICATION forming part of Letters Patent No. 709,388, dated September 16, 1902.

Application filed May 23, 1901. Serial No. 61,598. (No model.)

*To all whom it may concern:*

Be it known that I, AUGUSTO BONTEMPI, engineer, a subject of the King of Italy, and a resident of Strada Nuova Posillipo, Palazzo Lenci, Naples, in the Kingdom of Italy, have invented certain new and useful Improvements in Sculpturing-Machines, of which the following is a specification.

The present invention relates to a machine for the reproduction of plastic bodies or works of art.

The nature of this invention consists in the fact that the tracer is simply moved by hand while the movement of the boring or carving tool is effected by a suitable pressure agent or motive power by which the guiding of the pressure agent or motive power is effected by the tracer. As pressure agent hydraulic power, compressed air, or any suitable compressed or expanded gas may be used. Hydraulic power is, however, best suited for the purpose, since the arrangements therefor are the most simple. If motive power is employed, the motor can directly effect the movement of boring or carving tools by means of suitable transmission-gear, whereby the motor can be stopped at the moment desired by the influence of the tracer or said transmission-gear disconnected from the motor. If, however, the movement of the boring or carving tools is effected by a common transmission mechanism, the corresponding coupling mechanism is disengaged by the tracer when the movement of the tools is to be stopped. In any case the tools must therefore be directly or indirectly influenced by the tracer if they are to change their position, so that the movement of the tools always corresponds to the movement of the tracer. However, the machine may be constructed so that not the tools themselves, but the pieces of work with their frame, are caused to change their positions. In this case the movement of said pieces must also correspond to the movement of the tracer and be effected by the latter.

In the drawings, Figure 1 shows a schematic illustration of an electrical driving means for my improved machine. Fig. 2 is a similar view of a hydraulic driving means. Fig. 3 is a longitudinal section on the line III III, Fig. 8, showing in vertical section both the frame which receives the model 59 and that which receives the material to be worked. Fig. 4 is another embodiment of Fig. 3. Fig. 5 shows the respective frames shown in Fig. 3 for the reception of the models and of the pieces of material to be worked in the view seen in the direction of the arrow 47. Fig. 6 illustrates a view of Fig. 3 as seen in the direction of the arrow 48. Fig. 7 shows a longitudinal section of Fig. 8 on the line VII VII. Fig. 8 is a plan view of the machine without the frames for the model and the pieces of material to be worked. Fig. 9 is a horizontal section of Fig. 7 on the line IX IX. Figs. 10 to 13 show details of construction in the apparatus. Figs. 14 and 15 are sectional views of the mounting for the pulleys for driving the boring-tools.

The influence of the position of the tracer on the position of the boring or carving tools is shown in Figs. 1 and 2 of the annexed drawings. Fig. 1 represents an arrangement in which the tool 15 is displaced in its axial direction by electromotive force. The tracer 16 is, for instance, provided with a slide 18, arranged between the contacts 19 and 20 or 21 and 22. The support 23, on which the contacts 19 to 22 are mounted, is connected with the shaft of the tool 15 by means of the arm 24. The electromotor 25 exercises a displacing influence on the tool by means of any suitable transmission-gear 26. If, for instance, the tracer 16 is moved forward until its end is brought into contact with the point 27, the slide 18 is brought between the two contacts 19 and 20, by which the circuit 28 is closed and the motor 25 is put into operation. The said tracer 16 consequently causes the tool 15 to move forward in an axial direction until its point reaches the point 29. If the tool in its forward movement comes into contact with material on the piece of work, the said material is worked away for the extent of this period of movement, for the tool also receives a rotary movement by the pulley 30. In consequence of the forward displacement of the tool by the motor the support 23, with the contacts 19 to 22, is simultaneously moved forward, and as soon as the tool has completed its movement the slide 18 is brought back between the contacts 19 20 and 21 22, so that the circuit 28 is interrupted and the motor again disengaged. If the tracer 16 is moved to the right, so that the slide 18 is brought between the contacts 21 22, the circuit 31 is closed, and the same occurrence takes place in the opposite direction.

The form of construction shown in Fig. 2 consists of an arrangement by which hydraulic power is employed for operating the tool. 16 is the tracer, the rod of which carries a double guiding-piston 32, which latter is movably arranged in a cylinder 37. The latter is provided with two transmission-ports 34 and 35, one inlet-port 36, and two exhaust-ports 33. The tool 15 is, for instance, connected with a cylinder 38, which is provided with two ports 39 and 40. The said cylinder is connected with the cylinder 37, for instance, by means of a rod 41 or the like. The rod 42 of the piston 43, arranged in the cylinder 38, is fixed at 44. If the tracer 16 is moved with the double piston 33 32 to the left until its point comes into contact with the point 27, the ports 34 and 35, which up to that moment had been covered by the piston 32, are opened, so that the water which is in the chamber 45 of the cylinder 38 can pass through the port 40 and through a hose connection or the like into the port 34 and from there pass out through one of the ports 33, while the water admitted at 36 passes through the port 35 and through a suitable hose into the port 39, and thence into the cylinder-chamber 46, where it acts on the piston 43. Since the piston, however, cannot be displaced, a displacement of the cylinder 38 takes place to the left, and simultaneously the displacement of the tool 15 and cylinder 37, until the point of the tool has reached the point 29. In this position the double piston again covers the ports 34 and 35, so that the further movement of the cylinder 38, carrying the tool 15, ceases. If the tracer 16, however, is moved to the right, the same movements occur, but in the opposite direction.

Up to the present only the axial displacement of the tool has been referred to in Figs. 1 and 2. It is, however, evident that also the lateral—for instance, the oscillating—movement thereof can be effected in a similar manner by the oscillating movement of the tracer. Figs. 1 and 2 only serve for the better comprehension of the form of construction shown in the drawings, which is adapted for machines in which hydraulic power is employed as the motive force In this case it is immaterial whether, in view of the practical form of construction shown in Fig. 2 or in the other figures, guiding-pistons or other guiding mechanism—for instance, slides or valves—are used. The arrangement of this example of construction is as follows: The known frame for receiving the model and pieces of work consists of the base-plate 49, in which the two standards 50 are movable horizontally by means of a screw-threaded rod 52, arranged in bearings 51 on the base-plate 49, said screw being adapted to be turned to the right or left by a worm-gear 53. In the said standards 50.a frame 54 can be moved horizontally in the direction of the arrows 47 and 48 of Fig. 3 by the guides 55. In the frame 54 a vertical frame 56 is arranged, which, by means of the counterweights 58, suspended by cords or the like 57, is kept in suspension, so that it can be easily moved up and down. Into this frame 56 the model 59 and the pieces of work 60 are inserted, which can both be caused to simultaneously revolve on their axes by an ordinary work-gear 61. The said frame 56 is consequently adjustable in all directions in order to avoid too great a lateral movement of the tracer and tools and to enable the model and work to be brought into working position. This is especially of advantage in connection with large objects. However, the said frame may be constructed so that the parts 50 54 56 are stationarily arranged and the model 59 and the pieces of work 60 only turn on their axes, while the machine is movable and adjustable on the base-plate in all directions.

The parts of the machine representing the object of the present invention—that is to say, the tracer and carving or boring tools and the guiding and actuating mechanisms which come into consideration—are all arranged in the common frame 62. In said frame a table 63 is movably arranged. The tracer 16, which is provided with a handle 71, can be displaced in a double arm 65 and 70 in an axial direction. The double arm itself is arranged in the support 64, so that it can move freely in all directions. However, in order to limit its free or oscillating movement the arm 65 catches into a comparatively large ring 67, fixed on the table 63, so that the tracer can only perform the oscillating movement permitted by said ring. The free oscillating movement of the tracer in the support 64 can be effected either by the ball or socket joint 68, (shown in Fig. 3,) or by the Cardan suspension 69, (shown in Fig. 12,) or by any other suitable means. In order to overbalance the tracer, the arm 65 can be provided with a counterweight 66.

The axial displacement of the tools is effected by the tracer 16 in the following manner: As shown in Fig. 3, the arm 70 may be simultaneously provided with the valve-cylinder 37, (shown in Fig. 2,) and the double piston 32 is made integral with the tracer 16 or is rigidly connected therewith. On the lower side of the table 63 the operating-cylinder 38 and piston-rod 42 of the piston 43, arranged in the said cylinder 38, are fixed in the support 44, arranged on the frame 62. Water is passed to the guide-cylinder 37 through the pipe 73, which is fitted to the supply-pipe 72, as shown in Figs. 6 and 8. If the tracer 16 is moved to the left, the water, which has been introduced into the chamber 74 of the cylinder 37 through said pipe 73, passes through the pipe 75 into the chamber 46 of the operating-cylinder 38, so that, since the piston 43 cannot be displaced, the operating-cylinder, with the table 63 and the tools 15 arranged thereon, as shown in Fig. 8, is likewise moved to the left until the point of the tool arrives in the same plane as that of the point of the tracer. However, since the cylinder 37 is fixed to the double arm 70 and 65 and the latter in its turn is arranged in the support 64, fixed on the table 63, said cylinder 37 follows the forward movement of the tools. When the point of the tool has reached the same plane as the point of the tracer, the two ports 34 and 35 of the cylinder 37 are again covered by the double piston, and the water has no further effect in the operating-cylinder 38. If the tracer is moved to the right, the water passes through the pipe 73, port 34, and pipe 76 into the chamber 45 of the operating-cylinder 38, while it can flow out from the chamber 46 through the pipe 75, port 35, and exhaust-port 33. The water admitted to the chamber 45 of the cylinder 38 operates there in the same manner, but in an opposite direction, so that the table 63, with the cylinder 37, and all the tools are moved to the right until the points of said tools are brought back into the same plane as the point of the tracer.

In the form of construction shown in Fig. 4 the valve-cylinder 37 is also fixed to the under side of the work-table 63. In this case the tracer operates on the piston-rod 77 of said cylinder 37 by means of a double lever 78, which oscillates in a support 79, arranged on the table. In order to enable the tracer to perform its oscillating movement, said double lever 78 is provided with a longitudinal slot 80, through which is passed a pin 81. Further, between the piston-rod 77 and double lever 78 a connecting-piece 82 is inserted. If the tracer is moved to the left, water introduced through the pipe 73 also passes through the pipe 75 into the operating-cylinder 38 and causes the work-table 63, with the valve-cylinder 37, and tools to move to the left, while the reverse takes place when the tracer is moved to the right and the water is passed through the pipe 76 into said cylinder 38. If it is desired that the tools should perform an oscillating movement in the vertical plane, the tracer 16 must previously execute this movement. For this purpose the double arm 65 and 70, (shown in Fig. 3,) which serves as a support for the tracer, is provided at its left-hand end with a downwardly-directed angular arm 83, which, as shown in Fig. 6, is in connection with the double piston 32' of the valve-cylinder 37'. In this case said cylinder is adapted to slide vertically in a support 84, fixed on the table 63, as shown in Figs. 3, 4, 6, and 10 and 11, and is, on the one hand, connected with the common supply-pipe 72 by the pipe 73' and, on the other hand, with the operating-cylinder 38', fixed in the frame 62 of the machine, by the pipes 75' and 76'. Contrary to the cylinder 38, the cylinder 38' is in this case fixed while its piston executes the movement. The rod 42' of the said piston is flexibly connected by means of an intermediate joint 85 with the double arm 86, fixed on the shaft 88, which is revolubly arranged in the frame. The said double arm is provided with a counterweight 87. However, as will be seen from Figs. 6 to 8, each tool 15 is inserted in a motive shaft 89, and each such shaft is arranged in a long bearing 90. Each bearing oscillates with two trunnions 91 in a support 92, adapted to be revolved on the table 63. On the said table a shaft 94 is arranged in supports 93, on which shaft a double-armed lever 95 for each bearing 90 may be mounted, if required. One arm of this double lever is connected with the left-hand end of the bearing 90 by means of a link 96, provided with ball-and-socket joint, while the second arm thereof is flexibly connected by means of a rod 97 with the double lever 98, mounted on the shaft 88. Each of these double levers 98 is also provided with a counterweight 99. If the tracer 16, with its support 70 and 65, is, for instance, moved downward, water admitted through the pipe 73' passes through pipe 75' into the lower part of the operating-cylinder 38', so that the piston in said cylinder is pressed upward and the shaft 88 is caused to execute a rotating movement to the right. This movement is also performed by the double-armed levers 98, so that each lever 95 oscillates in the direction to the left, in consequence of which each bearing 90 executes the same oscillating movement—that is to say, in the direction to the left—and each tool must follow the motion of the tracer. However, in order to cause the tool to automatically cease its downward motion when its point is brought into the same plane as the point of the tracer the following arrangement is provided: On the shaft 94 is mounted a double-armed lever 100, the right-hand end of which, as shown in Figs. 3 and 4, is flexibly connected with the piston-rod of the operating-cylinder 38', while the left-hand end, for instance, engages a pin 103, arranged on the slide 102 of the valve-cylinder 37'. When the piston of cylinder 38' rises, the said lever 100 is simultaneously caused to oscillate to the left, thus causing the valve-cylinder 37' to move downward, so that the further supply of water to the operating-cylinder 38' is cut off. If the tracer 16 is moved upward, the same occurrence takes place in the reverse direction, which movement is followed by the tool. It is preferred to have the cutting of the tools 15 take place during movement in one vertical direction only—for instance, as shown in the drawings, during downward movement—for which purpose the tracer 16 will constantly execute its downward movement in contact with the model and move in the other direction out of contact therewith, producing a greater resistance to the movement of the tools 15 in their downward movement, and consequently subjecting the piston in the operating-cylinder 38' to a large amount of work in one direction and comparatively little work in the other direction. To overcome this difference in the work required of the piston, the counterweights 87 and 99 are employed and are mounted on the outer end of the double levers 86 and 98, so as to lift the inner ends of said double levers and impart through levers 95 and 100 to the tools 15 and 16 a downward movement, thereby assisting the piston to perform its work during the downward movement of the tools and equalizing the work of the piston in the opposite direction when there is no resistance. If a laterally-oscillating movement of the tool is required, it is produced by means of such movement of the tracer 16, also by means of a valve-cylinder 37" and an operating-cylinder 38", Figs. 6, 7, 9. For this purpose the support of the tracer 16 is provided with a lateral arm 104, which is movably connected with the piston in the cylinder 37" by means of a link 105. If, for instance, the tracer 16 is moved in the direction of the arrow 106, Figs. 6, 8, the water conducted to the cylinder by the pipe 73" passes through the pipe 76" to the right-hand chamber of the operating-cylinder 38", fixed to the frame, so that the piston is moved to the left. As already stated, the supports 92 are revoluble on the table 63. The hollow pivot 107 of each support is provided with an arm 108, Fig. 9, and the arms are connected with each other by a bar 109. One of the arms 108 has an extension 110 connected with the piston-rod 42", so that the movement of the piston in the direction of the arrow 106 by the tracer 16 at the same time causes the supports 92 to revolve, and thus all boring-tools 15 to move in the same direction 106. The valve-cylinder 37" being, however, capable of reciprocation on the under side of the table and connected with the piston-rod 42" by an arm 111 the valve-cylinder 37" is also moved in the direction of the arrow 106 until the supply of water to the operating-cylinder 38" by the pipe 73" is cut off.

The horizontal movement of the borer 15 in the plane of Fig. 8 is in the practical embodiment very slight and amounts at the most to about twenty to forty millimeters, while 90 is connected to 95 through 96, and 95 cannot take part in the swinging movement of the borer in the plane of Fig. 8, so that the point of the borer will describe an arc whose radius is equal to the length of the link 96 in Fig. 7; but while the link 96 is in practice at least one-half meter long it follows that the slight movement of from twenty to forty millimeters of the boring-point in the plane of Fig. 8 will appear as a rectilinear movement, notwithstanding it lies in an arc which the link 96 describes as a radius. The slight arc which the boring-point in its movement of twenty to forty millimeters describes, therefore, does not matter, since the point of the borer only moves in the plane of Fig. 8 while it is working on indentations—such, for example, as producing the hollow of the mouth, the outer portion of the ear, the openings of the nostrils, depression of locks of hair, &c. In all other cases the point of the borer so far as concerns the plane of Fig. 8 always remains normal to the vertical axis of the material being worked. If the tracer is moved in the direction of the arrow 112, Figs. 6, 8, water passes from 37" through pipe 75" into the left-hand chamber of the cylinder 38" and the above-described action is reversed. The water used in the working 38' and 38" passes out through the exhaust-ports 33', as already stated. It will thus be seen that the tools are automatically compelled to follow all movements of the tracer. If the latter is moved at an acute angle to the horizontal or vertical, both valve-cylinders 37' and 37" and both operating-cylinders 38' and 38" come into action at the same time.

In the annexed drawings only two tools are shown; but of course the apparatus may be provided with more or with only one. In fact, all details may be modified to suit requirements or replaced by their equivalents. The oscillating motion in vertical or horizontal planes of the bearings 90 with the shafts 89 causes the driving-wheels 113 to assume inclined positions to the belt 114. (Indicated in Fig. 7 by dotted lines.) So, to prevent the belt from slipping from the wheels, the following arrangement is made: On the table 63 a standard 115, with a cross-piece 116, is placed, Figs. 6 and 7. Where the wheel 113 touches the shaft 89, the bearing 90 is provided with an enlargement 117, into which arms of the cross-piece 116 enter. At the end of each arm of the cross-piece is a box 118, upon which the driving-wheel 113 is loosely rotatable. This arrangement is shown in Fig. 14 in section on the line XIV XIV of Fig. 15 on an enlarged scale. Fig. 15 represents a cross-section of Fig. 14 on the line XV XV. To prevent the driving-wheel 113 from sliding from the box 118, the latter may be provided with a ring 119. The hole in the box 118 must, however, be large enough to allow of the shaft 89 moving freely in all directions in it. The shaft 89 can be caused to move with the wheel 113 by a pin 120 on the latter, which engages a groove of sufficient size in the shaft. Whatever oscillating movement the shaft makes the wheel 113 does not change its position with regard to the other transmitting-gear. The same result may be obtained by other means equivalent to those shown in Figs. 14 and 15.

Having thus described my invention, the following is what I claim as new therein and desire to secure by Letters Patent:

1. In a machine of the character described, the combination with a frame, of a tracer carried by said frame, of cutting-tools also carried by said frame, means operating said tools, a plurality of means moving said tools in a plurality of directions, and means controlled by said tracer and determining in advance the extent of movement of said tools.

2. In a machine of the character described, the combination with a frame, of a tracer carried by said frame, of cutting-tools also carried by said frame, of a plurality of hydraulic-pressure means moving said tools in a plurality of directions, means controlled by said tracer and determining the extent of such movement, means carrying the material to be operated upon, means for adjusting said material to the operating position of said tools, and means operating said tools.

3. In a machine of the character described, the combination with a frame, of a tracer mounted upon said frame, of cutting-tools also mounted upon said frame, means for operating said tools, a plurality of suitable hydraulic-pressure means moving said tools in a plurality of directions, and means controlled by the movement of the tracer and determining in advance the extent of movement of the cutting-tools, while in operating position.

4. In a machine of the character described, the combination with a frame, of a tracer mounted thereon, of cutting-tools also mounted on said frame, means operating said tools, suitable pressure means effecting the movement of the tools in any desired direction, said pressure means comprising a working cylinder producing a vertical movement of the tools, a like cylinder producing a lateral movement of the tools, a third similar cylinder producing a longitudinal movement of the tools; of valve-cylinders, suitable connection between said valve-cylinders and said working cylinders, the valve-cylinders directing the flow of pressure into any one of said working cylinders; and suitable connection between the tracer and the valves in the valve-cylinders.

5. In a machine of the character described, the combination with a frame, of a tracer mounted thereon, of cutting-tools also mounted on said frame, means operating said tools, suitable pressure means mounted on said frame and effecting the movement of the tools in any desired direction, said pressure means comprising a working cylinder producing a vertical movement of the tools, a like cylinder producing a lateral movement of the tools, a third similar cylinder producing a longitudinal movement of the tools; of a series of valve-cylinders, each of which is suitably connected with one of said working cylinders, of double piston-valves mounted on valve-rods and sliding within said valve-cylinders, said valves directing the pressure to said working cylinders and suitable connections between said tracer and the valve-rods to operate the valves.

6. In a machine of the character described, the combination with a frame, of a tracer mounted thereon, of cutting-tools also mounted on said frame, means operating said tools, of working cylinders suitably connected to said cutting-tools, one of said cylinders producing a lateral displacement of the tools, one of said cylinders producing a vertical displacement of the tools, and a third working cylinder producing a longitudinal displacement of the tools; of a valve-cylinder for each of said working cylinders, with suitable connection between the same, of a double piston-valve for each of said valve-cylinders, said valves being operated by the movement of said tracer to direct pressure into any one or more of said working cylinders.

7. In a machine of the character described, the combination with a frame, a tracer mounted thereon, of cutting-tools also mounted on said frame, a plurality of hydraulic-pressure means, each effecting the movement of said tools in a different direction, means actuated by the tracer for distributing said hydraulic pressure and determining in advance the extent of any movement of the tools, and means for operating said tools.

8. In a machine of the character described, the combination with a frame, a tracer mounted thereon, of cutting-tools also mounted thereon, means operating said tools, a plurality of hydraulic-pressure means moving said tools in a plurality of directions, means controlled by the tracer determining the extent of movement of the tools, and comprising means for putting into operation said pressure, and means for automatically cutting off said pressure when the tools have reached the end of their determined movement.

9. In a machine of the character described, the combination with a frame, of a table carried by said frame, of a support carried by said table, a tracer connected by a universal joint to said support, of cutting-tools also suitably supported on said table and capable of movement in a plurality of directions, means operating said tools, a plurality of hydraulic-pressure means moving said tools in a plurality of directions, and means operated by said tracer determining the extent of movement of said tools.

10. In a machine of the character described, the combination with a frame, of a table carried by said frame, of a tracer suitably mounted on said table to permit a movement of the same in any direction, of supports revolubly mounted on said table, of cutting-tools connected to said supports by universal joints, means for operating said tools, a plurality of hydraulic-pressure means moving said tools, in any direction while in operating position, and suitable connections between the tracer and said moving means to control the latter by the movement of the tracer, the movement of said tracer in any desired direction producing a movement of the tools in keeping therewith.

11. In a machine of the character described, the combination with a frame, of a table carried by said frame, of a tracer suitably mounted upon said table and movable thereon in any direction, of a series of shafts suitably mounted upon said table and cutting-tools carried thereby, of blocks suitably supported upon said table and concentric to said shafts, of pulleys loosely mounted upon said blocks, means for driving said pulleys, of pins carried by said pulleys, said pins engaging suitable slots in said shafts to rotate the latter, means for moving the said shafts in a plurality of directions and suitable connections between said moving means and said tracer to produce upon the movement of the tracer in any desired direction a subsequent corresponding movement of said shafts.

12. In a machine of the character described, the combination with a frame, of a slidable table carried thereby, of a tracer mounted on said table, of cutting-tools also mounted thereon, suitable pressure means for moving said tools in any desired direction, said means comprising working cylinders, one of said cylinders being secured to the under side of said table, a piston-rod being fixed to said frame and a piston within said cylinder, and carried by said rod, said cylinder moving said table to longitudinally displace said tools; the other cylinders being secured to said frame, a piston movable within each of said last-named cylinders, and suitable connection between said movable pistons and said tools, one of said movable pistons causing the lateral displacement of said tools; and the other causing the vertical displacement of said tools; of suitable connections between said tracer and said cylinders to control the pressure in said cylinders and means for operating said tools.

13. In a machine of the character described, the combination with a frame, of a sliding table carried thereby, of a tracer universally mounted on said table, of cutting-tools also universally mounted on said table, of valve-cylinders suitably mounted on said machine, of working cylinders, pistons working in said working cylinders, one of said working cylinders being mounted on said table, its piston being rigidly secured to said frame, the other working cylinders being mounted upon said frame, their pistons being suitably connected to said tools, means operating said tools, comprising shafts carrying said tools, blocks suitably mounted on said table and provided with central openings, said shafts extending through said openings, pulleys loosely mounted upon said blocks, slots in said shafts and pins projecting from said pulleys and engaging said slots; suitable valve-cylinders and suitable connections between said cylinders and the working cylinders; and double piston-valves within the valve-cylinders and mounted on valve-rods the outer ends of which are connected to said tracer.

In witness whereof I have hereunto set my hand in presence of two witnesses.

AUGUSTO BONTEMPI.

Witnesses:
MARY BELLE SCOTT-UDA,
HENRY W. GARGINTO.